United States Patent [19]

Joseph

[11] Patent Number: 5,015,397

[45] Date of Patent: May 14, 1991

[54] CROSS FLOW FILTRATION APPARATUS AND PROCESS

[76] Inventor: James J. Joseph, 203 Tilden Dr., P.O. Box 0232, East Syracuse, N.Y. 13057

[21] Appl. No.: 59,509

[22] Filed: Jun. 8, 1987

[51] Int. Cl.⁵ .............................................. B01D 37/04
[52] U.S. Cl. ..................................... 210/767; 210/437; 210/457; 210/497.1; 210/499; 29/163.7
[58] Field of Search ............ 210/767, 805, 806, 323.2, 210/494.1, 497.1, 497.01, 498, 499, 439, 443, 446, 437, 209, 210, 457; 29/163.5 CW, 163.5 F, 163.7, 163.8; 166/231, 232, 233, 227, 234; 162/18, 246

[56] References Cited

U.S. PATENT DOCUMENTS

| | | | |
|---|---|---|---|
| 3,437,204 | 4/1969 | Clarke-Pounder | 210/209 |
| 3,754,658 | 8/1973 | Messing | 210/443 |
| 3,794,179 | 2/1974 | Doucet | 210/433.1 |
| 3,805,958 | 4/1974 | Campbell | 210/443 |
| 3,825,119 | 7/1974 | Rost | 210/209 |
| 4,068,713 | 1/1978 | McGuire | 166/233 |
| 4,180,463 | 12/1979 | Calderon | 166/232 |
| 4,236,999 | 12/1980 | Burgess et al. | 209/250 |
| 4,421,646 | 12/1983 | Carrege et al. | 210/497.1 |
| 4,428,423 | 1/1984 | Koehler et al. | 210/497.1 |
| 4,494,603 | 1/1985 | Harguindey | 210/497.1 |

*Primary Examiner*—Richard V. Fisher
*Assistant Examiner*—Wanda L. Millard
*Attorney, Agent, or Firm*—Oblon, Spivak, McClelland, Maier & Neustadt

[57] ABSTRACT

A cross filter device which includes a tube of helically wound wedge wire. Contaminated influent enters at one end. As it flows through the tube, it becomes more concentrated with contaminants, while clarified liquid permeates through the tube wall. Parallel or series combinations of two or more elements enhances their capacity. The device is particularly suited for handling large volumes of grossly contaminated liquids, such as machining and grinding coolants.

11 Claims, 2 Drawing Sheets

CROSS FLOW FILTRATION APPARATUS AND PROCESS

BACKGROUND OF THE INVENTION

This invention relates to the separation of liquid from a suspension, and more particularly relates to a method, device and assembly for continuously removing liquid from a circulating suspension using a liquid permeable conduit.

Cross flow filtration is a technique which allows the filter element to maintain longer life because the flow of contaminated liquid across the element prevents the accumulation of contaminants and thus keeps it permeable, allowing clean liquid to permeate through the media while the contaminants are concentrated in an ever decreasing volume of liquid.

Since the cross flow concept depends upon the presence of sufficient liquid on the contaminant side of the element to keep the contaminant flowing across the element, it is in general less efficient in terms of the amount of liquid which can actually be separated from the contaminants during a single pass through the filter than other, more conventional filtering techniques. Thus, its use is generally restricted to those applications in which high clarity requirements dictate the use of tight membranes as filter elements. In these applications, the lower separation efficiency is apparently offset by the increased life of the membranes enabled by the cross flow technique.

It is a principal object of the invention to employ the cross flow technique of filtration in certain critical applications which are characterized by the need to treat relatively large volumes of contaminated liquids having relatively low clarity requirements.

It is another object of the invention to provide a filter device and method which are suitable for treating relatively large volumes of contaminated liquid having relatively low clarity requirements.

SUMMARY OF THE INVENTION

In accordance with one aspect of the invention, a cross flow filter device comprises a liquid permeable conduit having a length at least three times its largest cross section, and having a wall comprised of a screen, the screen preferably being in the form of a single strand of helically wound wedge wire.

In order to increase capacity, the length of the device may be increased, preferably to at least 4 to 10 times its largest cross section. In addition, two or more devices may be combined, for example, in parallel or in series, to create a cross flow filter assembly having increased capacity.

The screen is preferably composed of substantially parallel wedge wire elements, but could also take other forms, such as a woven mesh of wire having a wedge-shaped, round or other cross sectional configuration, or an apertured sheet, the apertures formed, for example, by laser cutting or chemically photoetching. The screen material may be metal, plastic or other material chosen for its ability to be fabricated into the desired shape, and to withstand the environment to which it will be subjected. In accordance with a preferred embodiment, a larger, liquid impermeable conduit surrounds at least a portion of the liquid permeable conduit.

In accordance with another aspect of the invention, there is provided a method for separating liquid from a contaminated influent, the process comprising the steps of passing the influent through a liquid permeable conduit having a wall comprised of a screen, and collecting the liquid which permeates through the screen.

Depending upon the particular application, the influent may either flow along the interior of the conduit, in which case the permeate passes out of the conduit, or the influent may flow along the exterior of the conduit, in which case the permeate passes into the conduit.

In accordance with a preferred embodiment of the method, the influent flows along the interior of the conduit, at a flow rate sufficient to substantially prevent the accumulation of solids in the conduit, and the liquid which permeates out of the conduit is collected in a larger cross section, liquid impermeable conduit surrounding at least a portion of the liquid permeable conduit.

The filtering device and method of the invention are particularly suitable for continuously and rapidly separating gross contaminants from a relatively large volume of circulating liquid, and thus should be particularly advantageous for use in applications where large amounts of contaminants are continuously produced as a direct result of the manufacturing process, for example, machining and grinding, where the material removed from a workpiece is continually picked up by a cooling and lubricating liquid flowing over the workpiece.

DESCRIPTION OF THE PREFERRED EMBODIMENTS

Figure 1:
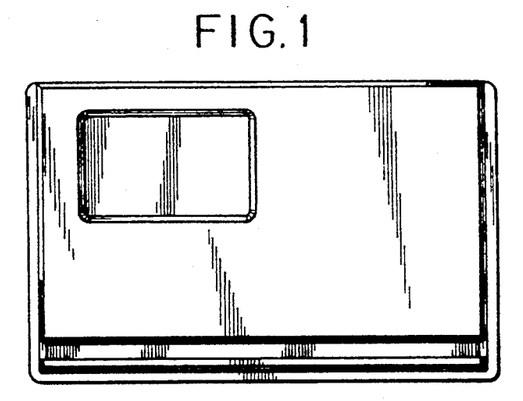
FIG. 1 is a diagrammatic elevation view of one embodiment of a filtering device of the invention, comprising a helically wound wedge wire tube.

Referring now to FIG. 1, cross flow filtering device 10 is a tube having a liquid permeable wall composed of helically wound wedge wire element 11 supported by several longitudinal ribs, two of which, 12 and 13 are shown. In operation, influent or feed liquid bearing contaminants enters the tube at one end, indicated by arrow I. Clarified liquid permeates through the openings between the wedge wire turns, as indicated by arrows P. Contaminants which cannot permeate through the openings between the wedge wire turns are flushed through the tube, and exit with the remaining liquid, designated the concentrate, as indicated by arrow C.

Of course, the size of the tube, as well as the size of the wedge wire element, the spacing between the turns, and the pitch of the turns can be varied to suit the particular application envisioned.

When influent is moved through such a wedge wire tube, properly sized and configured for the particular type and amount of contaminants, at a velocity of flow sufficient to keep the contaminants moving through the tube, (for example, about 8 feet per second or more), an equilibrium point will be reached at which permeate will continually flow from the tube.

Figure 2:
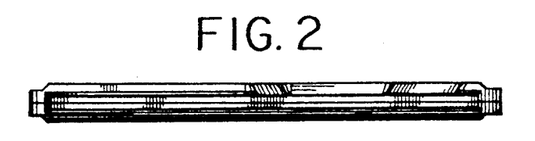
FIG. 2 is a cross section of two turns of the wedge wire tube of FIG. 1, showing the trapezoidal cross section of the wire.

FIG. 2 shows cross sections of two of the turns 11a and 11b of the wedge wire element of FIG. 1. These turns are oriented so that the bases 14 and 15, corresponding to the bases of trapezoidal cross sections 16 and 17, form the inner wall of the tube. This orientation is preferred in that contaminants which pass through the opening between the bases 14 and 15 will pass through the device with the permeate, rather than accumulating in the opening, where they could reduce or even stop the flow of permeate. In addition, contaminants which are too large to pass through but become momentarily trapped, are eventually dislodged and swept through the tube by the influent.

Figure 3:
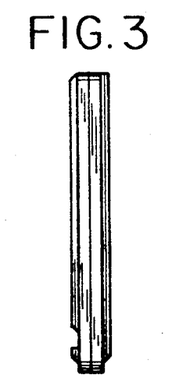
FIG. 3 is a diagrammatic end view of another embodiment of a filtering device of the invention, comprising longitudinally oriented wedge wire elements attached to the outer surface of supporting ribs.
Figure 4:
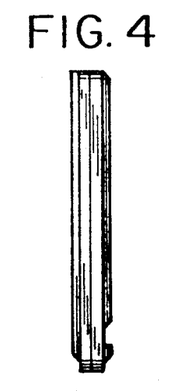
FIG. 4 is a view similar to FIG. 3, showing a variation of that embodiment in which the elements are attached to the inner surface of supporting ribs.

In addition to the helically wound embodiment of FIGS. 1 and 2, other embodiments are possible. For example, FIGS. 3 and 4 illustrate two embodiments in which separate wedge wire elements, only a few of which are shown (30 in FIG. 3 and 40 in FIG. 4), are oriented parallel to the tube axis, and are supported by attachment to hoop-shaped ribs, only one of which is shown (31 in FIG. 3 and 41 in FIG. 4). In FIG. 3, the elements are attached to the outside of the ribs, while in FIG. 4, the elements are attached to the inside of ribs.

The location of the ribs is dictated by design considerations as well as the manufacturing technique. For example, where the influent and contaminants are inside the tube and the permeate flows out of the tube, having the ribs on the outside will tend to minimize fouling of the openings by the contaminants in the influent. However, having the ribs on the inside may provide some control over both the velocity and direction of flow of the influent and the concentrate.

Figure 5:
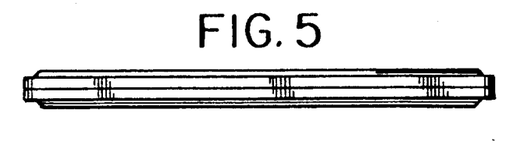
FIG. 5 is a diagrammatic view of a filtering device of the invention surrounded by a liquid impermeable outer conduit for collecting and directing permeate from the device.

FIG. 5 shows a preferred embodiment of the invention in which the filtering device 50 is surrounded by a larger liquid impermeable conduit 51 for collecting and directing the clarified permeate, for example, via outlet 52.

The clarified permeate may be returned to the permeate reservoir for reuse, or may be further clarified, either by passing it through another cross flow filtering device of the invention, perhaps having smaller openings to filter out smaller sized contaminants, or by other filtering or clarification techniques known in the art.

Figure 6:
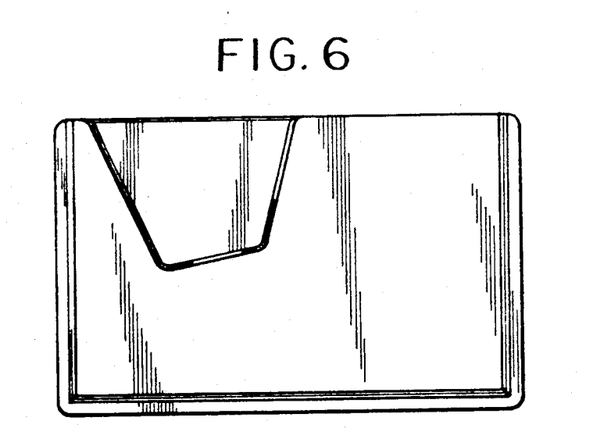
FIGS. 6 and 7 are diagrammatic views of filtering assemblies in which two filtering devices of the invention are connected in series, and in parallel, respectively.
Figure 7:
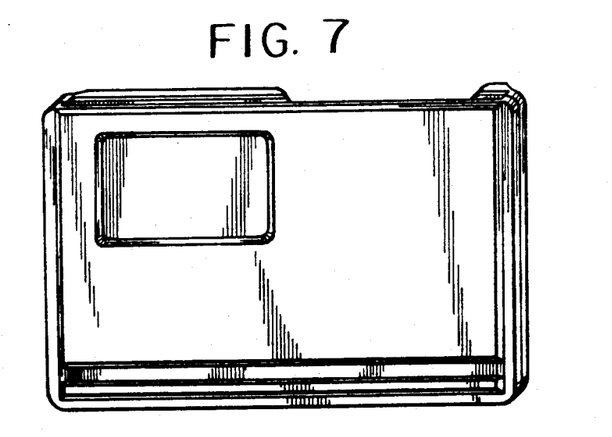

FIGS. 6 and 7 show two arrangements for assembling two or more filtering devices. In FIG. 6, filter elements 60 and 61 are connected in series by means of conduit 62, while in FIG. 7, filter elements 70 and 71 are connected in parallel by means of inlet tee 72 and outlet tee 73. The series arrangement may be employed where the elements have different filtering characteristics, for example, to accommodate the changing characteristics of the influent as it travels through the assembly. The parallel arrangement may be employed, for example, simply to increase filtering capacity.

The concentrate of course still contains the bulk of the contaminants, but the volume of liquid has been much reduced. This is advantageous in that the concentrate may now be treated by other, conventional filtering techniques using equipment having much less throughput capacity than would otherwise be necessary.

In the alternative, the capacity of existing filtering equipment may be considerably enhanced by the use of one or more of the filtering devices of the invention to concentrate the contaminated influent, and thereby the throughput of the equipment.

The invention will now be further illustrated by a series of examples of some typical filtering arrangements for different types and volumes of influent.

EXAMPLE 1

The filter element is a helically wound wedge wire tube, having a length of 12 inches and a diameter of 3 inches. The wire size is about 0.062 inches, and the spacing between the bases of the turns is 0.003 inches. The bases face outward and the turns are supported by ribs located on the inside of the turns. Such an element is suitable, for example, for influent having the following contaminants and flow rates (in gallons per minute):

| | |
|---|---|
| cast iron grindings | 60 |
| cast iron machinings | 60 |
| aluminum machinings | 75 |
| steel machining | 75 |

EXAMPLE 2

The filter element of Example 1 is inserted into a 5 inch diameter pipe.

EXAMPLE 3

Extending the length of the element of Example 1 by 12 inch increments will increase the flow rates proportionately. Thus, a 24 inch length will increase the flow rate of cast iron grindings to 120 gallons per minute.

EXAMPLE 4

The filter element is of the type described in Example 1, except that it has a length of 36 inches, and the bases of the turns face inward. The same flow rates are achieved for the contaminants as listed in Example 1.

A wedge wire filter element of the invention, properly sized and configured for the particular influent to be treated and the desired flow rate, will reach an equilibrium point at which flow of both permeate and concentrate are maintained. However, if the element becomes clogged or fouled, it may be cleared, for example, simply by scraping or scouring. Where the element is surrounded by a larger diameter pipe to accommodate the permeate, the element may be cleared by backwashing, that is, reversing the direction of flow to force clarified permeate back through the element. Fouling can be minimized by fitting the inside of the element with an auger-shaped insert to promote a spiral flow this will accelerate the flow of and impart a centrifugal force to the influent, which may be advantageous for example in increasing the flow of permeate and/or separating phases of different density from one another. As an alternative to the insert, the entire element could be rotatably mounted.

Another variation which may increase the flow rate of the permeate is to create a pressure differential across the element wall, for example, by increasing the influent flow rate, by restricting the flow of the concentrate, by increasing the ambient pressure inside the element, or by decreasing the ambient pressure outside the element.

A simple way to restrict the flow of concentrate is to configure the element to have a decreasing cross section in the direction of flow, for example, a conical configuration.

Where the element is surrounded by a larger diameter pipe to accommodate the flow of permeate, the outside ambient pressure could be reduced by drawing a vacuum at outlet 52 or at a separate outlet, such as outlet 53 in FIG. 5.

Figure 8:
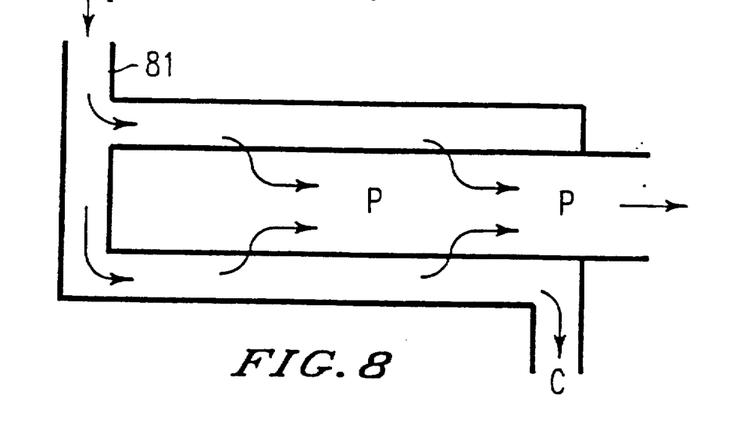
FIG. 8 is a diagrammatic view similar to that of FIG. 5 in which the direction of permeate flow is reversed.

FIG. 8 illustrates still another embodiment of the method of the invention, in which the direction of flow is reversed from that shown in FIG. 5. Influent enters liquid impermeable conduit 80 through inlet 81 and passes along the outside of liquid permeable element 82. Liquid permeates through the wall of element 82 and flows to outlet 83. Concentrate flows through outlet 84. In this embodiment, the wedge wire elements (not shown) are oriented so that the bases of the trapezoidal cross sections face outward.

What I claim as my invention is:

1. A cross flow filtration process for continuously separating a portion of a liquid from a contaminated substantially liquid influent to produce a concentrate, the process comprising the steps of introducing said influent at one end portion of a liquid permeable conduit having a wall comprised of a screen of substantially helically wound wire elements and which has a length at least three times its largest cross-section, continuously passing the influent along an interior portion of said screen, continuously collecting the liquid which permeates through the conduit, and passing said concentrate along said liquid permeable conduit and discharging said concentrate from an opposite end portion of said conduit.

2. The process of claim 1 in which the length of the conduit is from 4 to 10 times its largest cross section.

3. The process of claim 1, which comprises passing influent along the inside of the liquid permeable conduit, permeating liquid through the screen to the outside of the liquid permeable conduit, and collecting said liquid in a larger cross-section liquid impermeable conduit surrounding at least a portion of the liquid permeable conduit.

4. A cross flow filtration process for continuously separating a portion of a liquid from a contaminated influent to produce a concentrate, the process comprising the steps of introducing said influent at one end portion of a liquid permeable conduit having a wall comprised of a screen and which has a length at least three times its largest cross-section, continuously passing the influent along an interior portion of said screen, continuously collecting the liquid which permeates through the conduit, passing said concentrate along said liquid permeable conduit, discharging said concentrate from an opposite end of said conduit and passing influent along the inside of a larger cross-section liquid permeable conduit surrounding at least a portion of the liquid permeable conduit, passing the influent along the outside of the liquid permeable conduit, and permeating liquid through the screen to the inside of the liquid permeable conduit, and collecting liquid from a permeate outlet in the liquid permeable conduit.

5. A cross flow filtration assembly for continuously separating a portion of a liquid from a contaminated influent to produce a concentrate of higher contamination and a permeate of lower contamination, the assembly comprising a liquid permeable conduit having an influent inlet and a concentrate outlet, said liquid permeable conduit also having a length of at least three times its largest cross-section from influent inlet to concentrate outlet, and having a wall comprised of a screen, the assembly further comprising a liquid permeable conduit having an influent inlet and a concentrate outlet and a larger cross-section than and at least partially surrounding the liquid permeable conduit, such that in operation influent flows into said inlet of the liquid permeable conduit and along the liquid permeable conduit while concentrate is discharged from said outlet of said liquid permeable conduit and a portion of the liquid from the influent permeates through the screen wall of the liquid permeable conduit.

6. The apparatus of claim 5 in which the length of the conduit is from about 4 to 10 times its largest cross-section.

7. An assembly for continuously separating a portion of a liquid from a contaminated influent to produce a concentrate, the assembly comprising a liquid permeable conduit having an influent inlet and a concentrate outlet, said liquid permeable conduit also having a length of at least three times its largest cross-section from influent inlet to concentrate outlet, and having a wall comprised of a screen, the assembly further comprising a liquid impermeable conduit having a larger cross-section than and at least partially surrounding the liquid permeable conduit, such that in operation influent flows into said inlet and along the liquid permeable conduit while concentrate is discharged from said outlet of said liquid permeable conduit and a portion of the liquid from the influent permeates through the screen wherein the screen comprises a tube of helically wound wedge wire.

8. The apparatus of claim 7 in which the base of the wedge wire corresponds to the inner wall of the tube.

9. An assembly for continuously separating a portion of a liquid from a contaminated influent to produce a concentrate of higher contamination and a permeate of lower contamination, the assembly comprising a liquid permeable conduit having an influent inlet and a concentrate outlet, said liquid permeable conduit also having a length of at least three times its largest cross-section from influent inlet to concentrate outlet, and having a wall comprised of a screen, the assembly further comprising a liquid impermeable conduit having a larger cross-section than and at least partially surrounding the liquid permeable conduit, such that in operation influent flows into said inlet of said liquid permeable conduit and along the liquid permeable conduit while concentrate is discharged form said outlet of said liquid permeable conduit and a portion of the liquid from the influent permeates through the screen wall of the liquid permeable conduit wherein the screen wall comprises at least one substantially helically wound spaced wedge wire element.

10. A process for continuously separating a portion of a liquid from a contaminated influent to produce a concentrate, the process comprising the steps of introducing said influent at one end portion of a liquid permeable conduit having a wall comprised of a screen and which has a length at least three times its largest cross-section, continuously passing the influent along an interior portion of said screen, continuously collecting the liquid which permeates through the conduit, and passing said concentrate along said liquid permeable conduit and discharging said concentrate from an opposite end portion of said conduit wherein said screen comprises at least one substantially helically wound spaced wedge wire element.

11. A process for continuously separating a portion of a liquid from a contaminated influent to produce a concentrate, the process comprising the steps of introducing said influent at one end portion of a liquid permeable conduit having a wall comprised of a screen and which has a length at least three times its largest cross-section, continuously passing the influent along an interior portion of said screen, continuously collecting the liquid which permeates through the conduit, and passing said concentrate along said liquid permeable conduit and discharging said concentrate from an opposite end portion of said conduit wherein said screen comprises a tube of helically wound wedge wire.

* * * * *

UNITED STATES PATENT AND TRADEMARK OFFICE
CERTIFICATE OF CORRECTION

Page 1 of 4

PATENT NO. : 5,015,397

DATED : May 14, 1991

INVENTOR(S) : James J. Joseph

It is certified that error appears in the above-identified patent and that said Letters Patent is hereby corrected as shown below:

The sheets of drawings consisting of Figures 1-7, should be deleted to appear as per attached sheets.

Signed and Sealed this

Twenty-fourth Day of September, 1991

Attest:

HARRY F. MANBECK, JR.

Attesting Officer

Commissioner of Patents and Trademarks

United States Patent
Joseph

[11] Patent Number: 5,015,397
[45] Date of Patent: May 14, 1991

[54] CROSS FLOW FILTRATION APPARATUS AND PROCESS

[76] Inventor: James J. Joseph, 203 Tilden Dr., P.O. Box 0232, East Syracuse, N.Y. 13057

[21] Appl. No.: 59,509

[22] Filed: Jun. 8, 1987

[51] Int. Cl.⁵ .................................. B01D 37/04
[52] U.S. Cl. ............................ 210/767; 210/437; 210/457; 210/497.1; 210/499; 29/163.7
[58] Field of Search .......... 210/767, 805, 806, 323.2, 210/494.1, 497.1, 497.01, 498, 499, 439, 443, 446, 437, 209, 210, 457; 29/163.5 CW, 163.5 F, 163.7, 163.8; 166/231, 232, 233, 227, 234; 162/18, 246

[56] References Cited

U.S. PATENT DOCUMENTS

| 3,437,204 | 4/1969 | Clarke-Pounder | 210/209 |
| 3,754,658 | 8/1973 | Messing | 210/443 |
| 3,794,179 | 2/1974 | Doucet | 210/433.1 |
| 3,805,958 | 4/1974 | Campbell | 210/443 |
| 3,825,119 | 7/1974 | Rost | 210/209 |
| 4,068,713 | 1/1978 | McGuire | 166/233 |
| 4,180,463 | 12/1979 | Calderon | 166/232 |
| 4,236,999 | 12/1980 | Burgess et al. | 209/250 |
| 4,421,646 | 12/1983 | Carrege et al. | 210/497.1 |
| 4,428,423 | 1/1984 | Koehler et al. | 210/497.1 |
| 4,494,603 | 1/1985 | Harguindey | 210/497.1 |

*Primary Examiner*—Richard V. Fisher
*Assistant Examiner*—Wanda L. Millard
*Attorney, Agent, or Firm*—Oblon, Spivak, McClelland, Maier & Neustadt

[57] ABSTRACT

A cross filter device which includes a tube of helically wound wedge wire. Contaminated influent enters at one end. As it flows through the tube, it becomes more concentrated with contaminants, while clarified liquid permeates through the tube wall. Parallel or series combinations of two or more elements enhances their capacity. The device is particularly suited for handling large volumes of grossly contaminated liquids, such as machining and grinding coolants.

11 Claims, 2 Drawing Sheets

Pat. No. 5,015,397